(12) United States Patent
Zhang et al.

(10) Patent No.: US 9,621,044 B2
(45) Date of Patent: *Apr. 11, 2017

(54) ZERO VOLTAGE SOFT SWITCHING SCHEME FOR POWER CONVERTERS

(71) Applicant: NAVITAS SEMICONDUCTOR INC., El Segundo, CA (US)

(72) Inventors: Ju Jason Zhang, Monterey Park, CA (US); Daniel M. Kinzer, El Segundo, CA (US)

(73) Assignee: NAVITAS SEMICONDUCTOR INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,249

(22) Filed: Apr. 1, 2016

(65) Prior Publication Data

US 2016/0218623 A1    Jul. 28, 2016

Related U.S. Application Data

(63) Continuation of application No. 14/554,871, filed on Nov. 26, 2014, now Pat. No. 9,379,620.
(Continued)

(51) Int. Cl.
*H02M 3/158* (2006.01)
*H02M 3/335* (2006.01)
(Continued)

(52) U.S. Cl.
CPC ............. *H02M 3/158* (2013.01); *H02M 1/44* (2013.01); *H02M 3/33507* (2013.01);
(Continued)

(58) Field of Classification Search
CPC ..... H02M 2001/342; H02M 2001/344; H02M 2001/346; H02M 2001/348;
(Continued)

(56) References Cited

U.S. PATENT DOCUMENTS 5,539,630 A    7/1996 Pietkiewicz et al.
5,808,879 A    9/1998 Liu et al.
(Continued)

FOREIGN PATENT DOCUMENTS

CN    10-1572490    11/2009
JP    05-316730    11/1993
(Continued)

OTHER PUBLICATIONS

U.S. Appl. No. 14/554,871 , "First Action Interview Office Action Summary", Aug. 26, 2015, 7 pages.
(Continued)

*Primary Examiner* — Emily P Pham
*Assistant Examiner* — Shahzeb K Ahmad
(74) *Attorney, Agent, or Firm* — Kilpatrick Townsend and Stockton, LLP

(57) ABSTRACT

A control scheme and architecture for a power conversion circuit employs two bidirectional switches and a zero voltage switching (ZVS) scheme for the high-side switch. Methods of incorporating the control scheme into multiple power conversion circuit topologies are disclosed. Methods of device integration including co-packaging and monolithic fabrication are also disclosed.

20 Claims, 9 Drawing Sheets

Related U.S. Application Data

(60) Provisional application No. 62/059,008, filed on Oct. 2, 2014.

(51) Int. Cl.
  H02M 1/44 (2007.01)
  H02M 1/00 (2006.01)

(52) U.S. Cl.
  CPC ........ H02M 3/33569 (2013.01); *H02M 3/335* (2013.01); *H02M 2001/0058* (2013.01); *Y02B 70/1491* (2013.01)

(58) Field of Classification Search
  CPC .......... H02M 2001/0016; H02M 3/156–3/158; H02M 3/335; H02M 3/33507; H02M 3/3376; H02M 3/33584; H02M 1/34; H02M 5/04; H02M 5/275; H02M 5/293; H02M 5/2932; H02M 7/21; H02M 7/217; H02M 7/1626
  See application file for complete search history.

(56) References Cited

U.S. PATENT DOCUMENTS

| | | | |
|---|---|---|---|
| 6,269,014 | B1 | 7/2001 | Sander et al. |
| 6,462,962 | B1 | 10/2002 | Cuk et al. |
| 6,947,297 | B2 * | 9/2005 | Ke ............ H02M 1/34 363/20 |
| 2003/0174521 | A1 | 9/2003 | Batarseh et al. |
| 2013/0187627 | A1 | 7/2013 | Imada et al. |
| 2013/0249621 | A1 | 9/2013 | Gagne et al. |
| 2014/0112043 | A1 | 4/2014 | Yamahira |
| 2014/0374766 | A1 | 12/2014 | Bahl et al. |
| 2015/0092453 | A1 | 4/2015 | Ohtake et al. |
| 2015/0381031 | A1 | 12/2015 | Ghosh et al. |

FOREIGN PATENT DOCUMENTS

| | | |
|---|---|---|
| JP | 2011-087388 | 4/2011 |
| KR | 10-1998-0011537 | 4/1998 |

OTHER PUBLICATIONS

U.S. Appl. No. 14/554,871, "First Action Interview Office Action Summary", Nov. 9, 2015, 5 pages.
PCT/US2015/053028, "International Search Report and Written Opinion", Jan. 13, 2016, 10 pages.
U.S. Appl. No. 14/554,871, "Final Office Action", Jan. 15, 2016, 17 pages.
U.S. Appl. No. 14/554,871, "Notice of Allowance", Mar. 1, 2016, 11 pages.

* cited by examiner

ZERO VOLTAGE SOFT SWITCHING SCHEME FOR POWER CONVERTERS

CROSS-REFERENCES TO RELATED APPLICATIONS

This application is a continuation of application Ser. No. 14/554,871 filed on Nov. 26, 2014 for "ZERO VOLTAGE SOFT SWITCHING SCHEME FOR POWER CONVERTERS" that claims priority to Provisional Application No. 62/059,008, filed Oct. 2, 2014, titled "ZERO VOLTAGE SOFT SWITCHING SCHEME FOR POWER CONVERTERS", which are all hereby incorporated by reference in their entirety for all purposes.

FIELD

The present invention relates generally to soft switched power converters, and in particular to zero voltage soft switching (ZVS) in Flyback, Forward, Buck, Buck/Boost, Boost and other topologies.

BACKGROUND

Switched mode power converters are ubiquitous and are often used to convert one form of power to another. For example a Flyback converter may be employed in an electronic system to convert a high voltage alternating current (AC) bus (e.g., 220 volts AC) to a low voltage direct current (DC) bus (e.g., 5 volts DC) that may power a component such as a cellular phone. Switched mode power converters have three basic figures of merit: cost, size and efficiency. To be accepted in large volume applications, power converters must meet minimum requirements for all three specifications.

Power loss in a switch, or field-effect transistor (FET) employed in switched mode power converters comes from two sources. FETs have a resistive element, that dissipates power as current is conducted through the device. The resistive parameter is typically called "on-resistance", or RDS(ON) (i.e., resistance from drain to source when the FET is biased on). These conduction losses are inversely proportional to the size of the FET (i.e., the larger the FET, the lower its RDS(ON) and, therefore, the lower its conduction loss). The other source of power loss is through switching losses. Every time a solid-state switch is turned on or off there is energy loss, as described in more detail below.

Increased switching frequency has been a significant factor in the improvement in the cost and size of switched mode power converters. Increased switching frequency typically reduces the size of peripheral components and provides improved transient response for demanding applications. However, as discussed above, increased switching frequency results in increased power loss and decreased efficiency for the power converter.

Two major factors contribute to power loss from switching the transistors: turn-on loss, or the energy used to charge drain-source capacitance (also commonly referred to as output capacitance or Coss); and crossover loss, or the energy lost during turn-on and turn-off transitions (i.e., the current and voltage overlap area as the switch transitions between states).

With regard to output capacitance, or Coss, as the FET switches on and off with a voltage potential across it, its intrinsic parasitic capacitance stores and then dissipates energy during each switching transition. Essentially there is an embedded capacitor within the switch that must be charged and discharged with each switching cycle. The output capacitance losses are proportional to the voltage across the switch, the switching frequency and the value of the parasitic capacitance. As the physical size of the FET increases, its output capacitance also increases. Therefore, as discussed above, increasing FET size may reduce RDS (ON), however it also increases output capacitance and thus increases switching loss.

To reduce high frequency switching losses, ZVS schemes have been proposed using silicon power devices, where the voltage potential across the switch is reduced to near 0 volts prior to operating the switch. This can significantly reduce crossover loss as there is almost no voltage potential across the switch when the switch is operated. Schemes have also been proposed that discharge the output capacitance (Coss) of the switch and recycle the energy back into the system, significantly reducing losses due to output capacitance, or Coss. However, ZVS schemes have not been widely adopted, especially in Flyback applications, as they are too costly and intractable.

For example, silicon devices have a relatively large output capacitance (Coss) (e.g., 200 picofarads) which takes a relatively long amount of time to charge. In high frequency applications, the time required to charge the output capacitance may limit the switching frequency of the converter. Further, silicon devices switch relatively slowly, (e.g., on the order of 20 nanoseconds) which also limits the switching frequency. Yet further, silicon devices are vertical structures typically fabricated such that the substrate is a drain terminal. Thus they do not lend themselves easily to monolithic integration with other devices as the other devices would be fabricated on the drain connection. This significantly restricts packaging and integration options to save packaging cost and size. Thus, in a two switch silicon-based power converter each switch is typically a separate device. The switch driver and controller circuits are also typically separate devices further increasing costs and increasing the driver delay due to packaging parasitics. Moreover, especially for high voltage applications (i.e., greater than 100 volts), silicon devices have poor performance characteristics and require large, slow, expensive driver circuits to operate. These and other factors have limited the adoption of ZVS architectures for silicon-based high frequency, high voltage applications.

SUMMARY

In one embodiment a new control scheme that drives bidirectional switch converters, such as a two-switch Flyback, using ZVS is disclosed. In one embodiment the new control scheme achieves ZVS, while minimizing excessive ripple current loss and maintains compatibility with pulse skipping or pulse frequency modulation (PFM) controller modes.

In one embodiment a power conversion circuit comprises a first solid-state bidirectional switch connected between a first terminal of a voltage source and a switch node. A second solid-state bidirectional switch is connected between the switch node and a second terminal of the voltage source. The second switch is configured to turn on before the first switch with a duration that is less than a time the first switch is off.

In one embodiment the power conversion circuit is configured to operate in a discontinuous mode while in another embodiment the circuit is configured to operate in a continuous current mode. In further embodiments the first and second solid-state bidirectional switches are GaN-based devices that operate between 50 kHz and 100 MHz.

In further embodiments the power conversion circuit is configured to operate at voltages between 100 V and 600 V. In one embodiment, the first and second solid-state bidirectional switches may be co-packaged while in other embodiments a switch driver may be co-packaged with the first and second solid-state bidirectional switches. In yet further embodiments the first and second solid-state bidirectional switches may be monolithically integrated on a first die comprising GaN. In other embodiments the first switch driver circuit and the first solid-state bidirectional switch are monolithically integrated on a first die and a second switch driver circuit and the second solid-state bidirectional switch are monolithically integrated on a second die.

In one embodiment the power conversion circuit may be disposed within a unitary electronic component. In some embodiments the component may be manufactured from an overmolded printed circuit board, while in other embodiments the component may comprise an overmolded lead frame. In further embodiments the component may comprise a driver circuit configured to turn on and off the first and second solid-state bidirectional switches. The switches may be disposed on a monolithic semiconductor substrate comprising GaN.

In one embodiment, a power conversion circuit may include a first solid-state bidirectional switch having a first switch output capacitance and connected between a first terminal of a voltage source and a switch node. A second solid-state bidirectional switch is connected between the switch node and a second terminal of the voltage source. The second switch is configured to turn on before the first switch with a duration that is less than the time that the first switch is off and to remain off for duration that is adequate to allow the first switch's output capacitance to discharge to approximately 0 volts before the first switch is turned on. In further embodiments a capacitor is connected in series between the second switch and the second terminal of the voltage source and is configured to reverse a direction of current. In one embodiment a transformer is connected in series between the switch node and the second terminal of the voltage source. The circuit may further be configured to turn on the first switch such that current flows through the transformer, and subsequently turn off the first switch such that the currently decreases to 0 amps and charges the capacitor. Next, the second switch is turned on allowing the capacitor to reverse the flow of current through the transformer. The second switch may then be turned off such that the reverse current discharges the output capacitance of the first switch to approximately 0 volts. The first switch is then turned on and the process is repeated.

DETAILED DESCRIPTION

Certain embodiments of the present invention relate to power conversion circuits. While the present invention can be useful for a wide variety of power conversion circuits, some embodiments of the invention are particularly useful for AC to DC and DC to DC converters that use ZVS bidirectional switches, as described in more detail below.

Many electronic devices such as smart-phones, media players, and tablet computers require low-voltage DC power to operate. Some electronic devices may be configured to connect to an AC mains to receive high-voltage AC power. To make the AC power useful to the electronic device, it is typically rectified to a high DC voltage which may subsequently be converted to a lower DC voltage by a DC to DC power conversion circuit. In some embodiments a ZVS high-efficiency DC to DC power conversion circuit that employs bidirectional switches and a novel control scheme may be used.

As defined herein, a bidirectional switch enables the conduction of current in two directions when in an on state and prevents the conduction of current in any direction when in an off state. It can further be defined as a switch that doesn't have an antiparallel body diode and it may block an unequal amount of voltage in either direction (i.e., it can block more voltage in one direction than the other). In some embodiments, a bidirectional switch may be fabricated on a GaN substrate. The lack of an antiparallel body diode in a bidirectional switch avoids reverse recovery problems experienced in silicon-based MOSFETs. This enables the bidirectional switch to change states relatively fast and to charge a Flyback clamp capacitor, which may be used to energize a transformer to achieve ZVS, as discussed in more detail below.

Comparatively, a silicon-based MOSFET has an antiparallel body diode, which is a PN junction diode that lies inside of the MOSFET between the n-region in the drain and the P-well in the source. The PN junction antiparallel body diode has reverse recovery charge, which causes the MOSFET to be relatively slow turning off such that it can block voltage.

Figure 1:
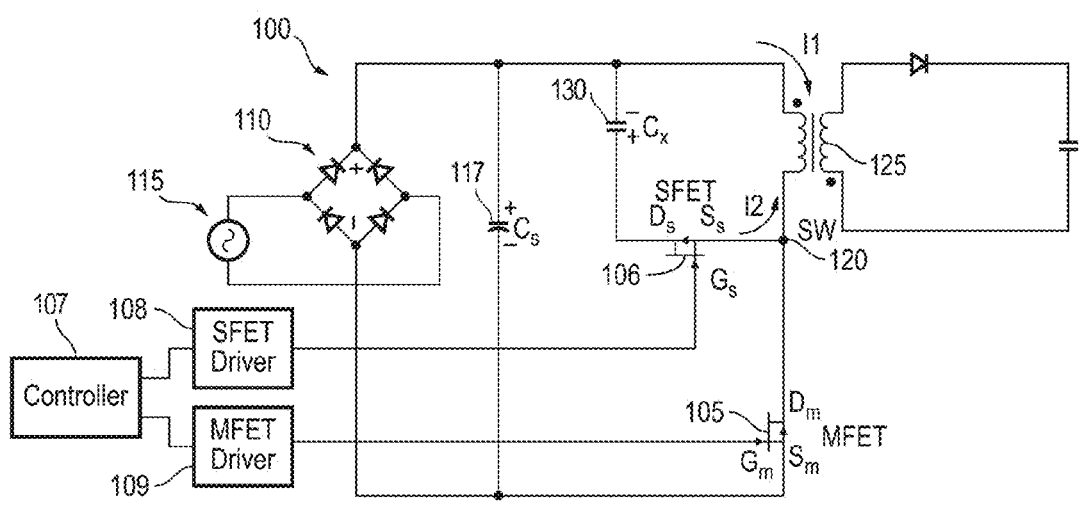
FIG. 1 is a circuit schematic of a Flyback converter using two bidirectional switches according to an embodiment of the invention.

Now referring to FIG. 1, a non-limiting example of a two-switch Flyback circuit 100 of one embodiment is illustrated. In some embodiments a main field-effect transistor (MFET) 105 and a second field-effect transistor (SFET) 106 may be used as bidirectional switches in the circuit. In further embodiments a novel control scheme may be used by circuit controller 107 to command SFET driver 108 and MFET driver 109 such that SFET 106 may be turned on slightly before the MFET, creating enough current to enable ZVS of MFET 105 (i.e., zero voltage soft-switching) as discussed in more detail below.

As used herein, ZVS means that the bidirectional semiconductor switch may be turned on or off only when the voltage applied across the switch is at or near zero (i.e., zero voltage switching or ZVS) and when the output capacitance, or Coss, is at or near zero charge. Switching losses (i.e., turning a switch off while it is conducting current or turning a switch on when it has a voltage potential across it) may be a significant contributor to power loss in the system. The use of ZVS may result in reduced switching losses, increased frequency of operation and in some embodiments, reduced electromagnetic interference (EMI) generation.

Continuing to refer to circuit 100 in FIG. 1, controller 107 may have logic and control functionality such that it can control the operation of MFET 105 and SFET 106 by sending one or more control signals to SFET driver 108 and MFET driver 109. In response to the one or more control signals, SFET driver 108 and MFET driver 109 may then send one or more gate drive signals to MFET 105 and SFET 106. In response to the one or more gate drive signals, MFET 105 and SFET 106 may then transition between an on state and off state. In some embodiments, circuit 100 may receive power from an AC mains 115. A full-wave rectifier 110 may convert AC mains 115 to a DC source having cyclical voltage variations at approximately twice the frequency of the AC mains. A smoothing capacitor (Cs) 117 may be used to smooth the cyclical voltage variations, creating a relatively steady high voltage DC source. MFET 105 may be used to switch on and off the high voltage DC source. In some embodiments MFET 105 may be a bidirectional N-channel gallium-nitride (GaN) high-electron mobility transistor (HEMT), however in other embodiments other switches may be used, as discussed in more detail below.

Figure 2:
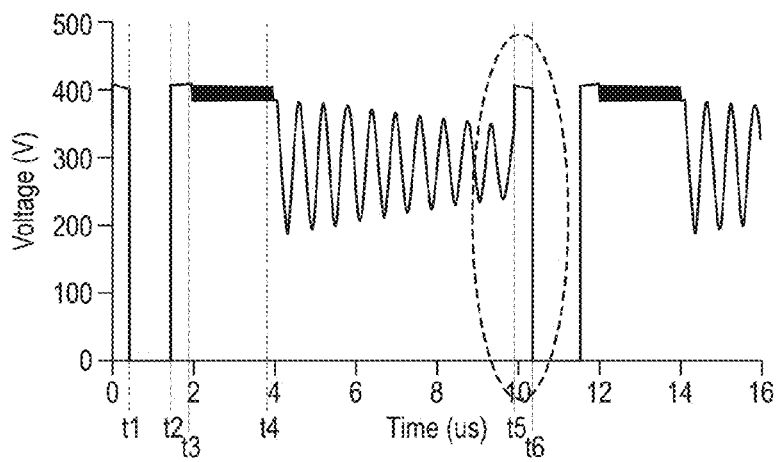
FIG. 2 is a plot of the switch node voltage for the circuit illustrated in FIG. 1.
Figure 3:
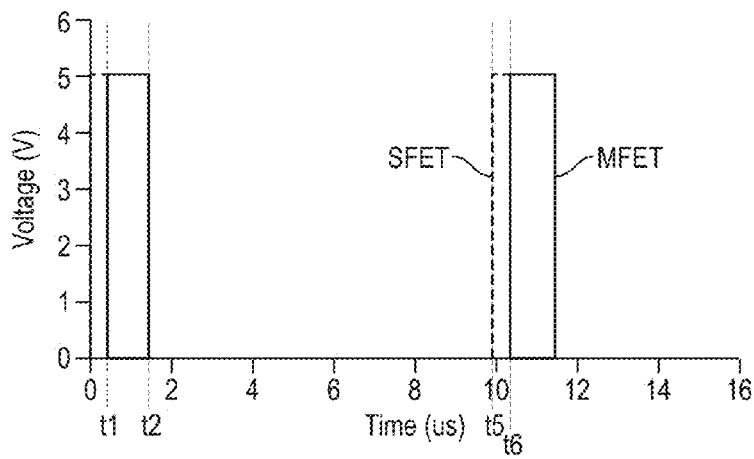
FIG. 3 is a plot of the gate voltages for the MFET and the SFET in the circuit illustrated in FIG. 1.
Figure 4:
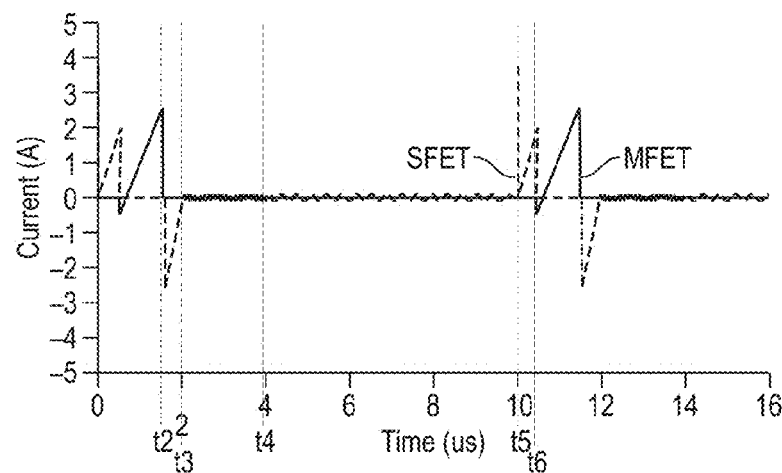
FIG. 4 is a plot of the current in the MFET and the SFET in the circuit illustrated in FIG. 1.
Figure 5:
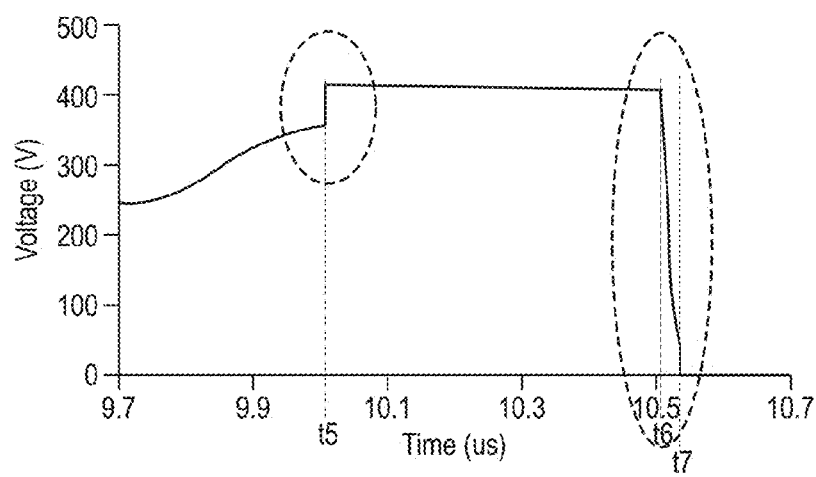
FIG. 5 is a blow up of a portion of the switch node voltage plot illustrated in FIG. 2.
Figure 6:
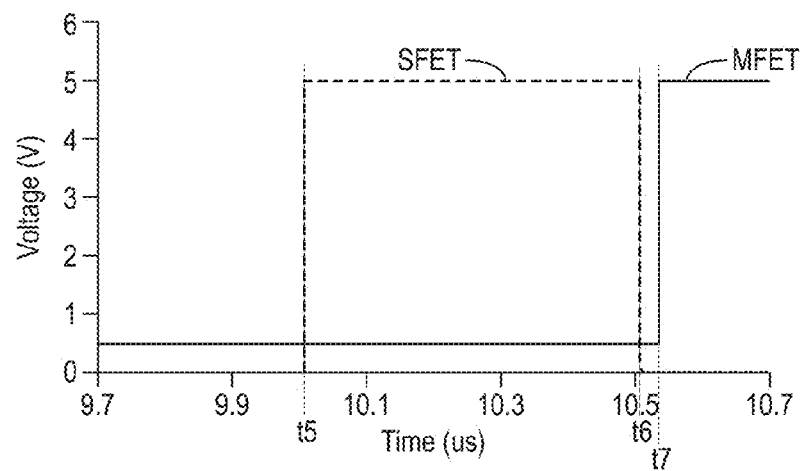
FIG. 6 is a blow up of a portion of the gate voltage plot illustrated in FIG. 3.
Figure 7:
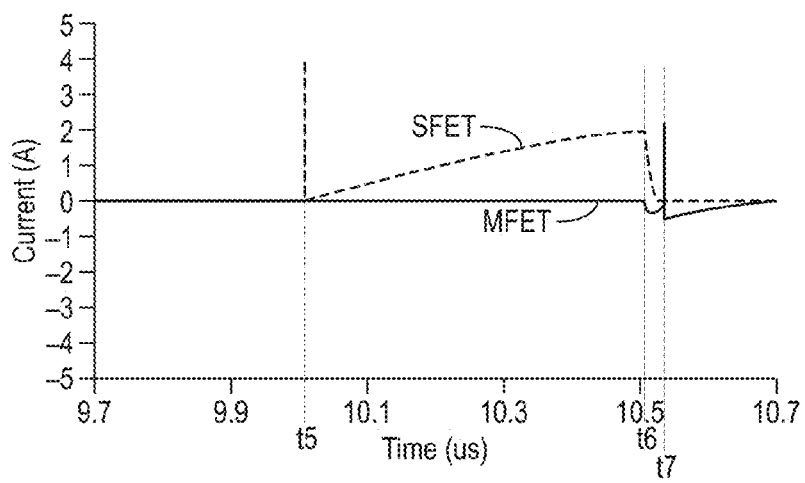
FIG. 7 is a blow up of a portion of the current in the MFET and the SFET plot illustrated in FIG. 4.

Now referring to FIGS. 2-7, plots of voltages and current within circuit 100 are shown. FIG. 2 illustrates the switch node (SW) 120 (see FIG. 1) voltage (Vsw). FIG. 3 illustrates gate voltages of MFET 105 and SFET 106. FIG. 4 illustrates the current in MFET 105 and SFET 106. FIGS. 5-7 are expansions of FIGS. 2-4 in the time range starting at 9.7 microseconds and ending at 10.7 microseconds.

Now referring to FIGS. 2-4, at time t1 controller 107 applies voltage to the gate of MFET 105, opening its channel and allowing current to flow from its drain (Dm) to its source (Sm). As shown in FIG. 2, the voltage at switch node V(sw) 120 is clamped to 0 volts and current flows in direction I1 illustrated in FIG. 1. In FIG. 4 the current within MFET 105 is shown which linearly increases with respect to time up to approximately 2.5 Amps. Transformer 125 will produce an opposing voltage across its terminals in response to the changing current. The rate of increase of current through MFET 105 may be dictated by the parameters of transformer 125 as current builds within its windings. During this time, transformer 125 is storing energy in the form of a magnetic field. Current in transformer 125 builds until MFET 105 is turned off at t2 (see FIGS. 2-4).

When MFET 105 is turned off at t2 by controller 107, the voltage potential from the full-wave rectifier will be removed from transformer 125. As illustrated in FIG. 4, since MFET 105 is turned off the MFET current rapidly transitions to 0 Amps and the voltage at the switch node goes back to the line voltage plus reflected output voltage, approximately 400 volts.

Transformers 125 resist changes in current so the stored energy in the magnetic field of the leakage inductance of the transformer will discharge, maintaining the flow of current in direction I1 which now flows through SFET 106. This current flows into and charges capacitor Cx 130. Because the energy flows into capacitor Cx 130, it is conserved, improving the efficiency of circuit 100.

At t3, the current stops flowing when transformer 125 has exhausted the energy stored within its leakage inductance. After t3, switch node voltage Vsw 120 (see graph shown in FIG. 2) may oscillate due to resonances within circuit 100. The oscillation between t3 and t4 may have a relatively high frequency and small amplitude, as secondary side transformer current still flows through the rectifier diode. In some embodiments this portion of the oscillation may be due to the leakage inductance of transformer 125 reacting with the output capacitance of MFET 105.

After t4 the current in the secondary side of transformer 125 reduces to zero and no more current flows through the rectifier diode. The larger amplitude and lower frequency may be due to the magnetizing inductance of transformer 125 interacting with the output capacitance of MFET 105.

Now referring to FIG. 2, controller 107 may be configured to monitor the voltage oscillations of switch node (SW) 120 and at a peak voltage (i.e., when the switch node voltage is near 400 volts) the controller turns SFET 106 on at t5. Stored charge in capacitor Cx 130 is then discharged into transformer 125, creating current in direction I2 which is in the opposite direction of the prior current, I1. Because SFET 106 turns on at the oscillation peak, the step up voltage to get switch node 120 voltage up to the line voltage is relatively small, resulting in a faster and more efficient transition. The step up and subsequent operation of SFET 106 illustrated in FIGS. 2-4 is shown in greater detail in FIGS. 5-7. FIG. 7 shows a current spike at t5 when SFET 106 is turned on due to the voltage step up. After the step up, current begins to build through SFET 106 and transformer 125 as illustrated in FIG. 7.

Capacitor Cx 130 continues to discharge and builds current (see FIG. 7) in transformer 125 and SFET 106 according to the characteristics of the transformer. Current in transformer 125 builds until t6 when SFET 106 is turned off by controller 107. Current can no longer flow through SFET 106 so it places a voltage potential on the output capacitance Coss of MFET 105. The voltage potential draws current from the output capacitance Coss of MFET 105 causing it to discharge. In some embodiments only MFET 105 output capacitance may be discharged, however in other embodiments MFET 105 may conduct in a reverse direction after Coss is fully discharged. The current flow discharges MFET 105 drain (Dm) voltage to approximately 0 volts at t7, as illustrated in FIG. 5. When switch node 120 voltage is at 0 volts the voltage potential across MFET 105 is approximately 0 volts and the output capacitance Coss of the MFET is discharged, enabling ZVS. The cycle starts over again at t1 where MFET 105 is turned on by controller 107 and current builds in transformer 125.

In some embodiments it may be beneficial for the switches to be able to withstand high voltage potentials and/or to switch at high frequencies, particularly when the transmitter runs off AC mains. In one embodiment the voltage potential across the switches may be in the range of 50-1000 volts DC and in another embodiment in the range of 100-600 volts DC. In one embodiment the voltage potential may be in the range of 100-250 volts DC and in another embodiment it may be in the range of 250-600 volts DC. In other embodiments the switching frequency may be in the range of 30 kHz-30 MHz while further embodiments it may operate in a range between 50 kHz-1 MHz. In another embodiment the switching frequency may be in the range of 100 kHz-500 kHz. In one embodiment the switching frequency may be 100 kHz.

In some embodiments, one or more of switches 105, 106 may be a FET. In one embodiment one or more of switches 105, 106 may be a GaN bidirectional FET. In another embodiment one or more of switches 105, 106 may be a JFET, while in other embodiments it may be a different type of FET or any other type of solid-state switch. GaN-based bidirectional switches may be particularly useful in embodiments that may be used to efficiently switch high voltage buses (e.g., 400 volts) at high frequencies (e.g., 0.1-30 MHz) as described in more detail below. In some embodiments the efficiency of the power conversion circuit may be in the range of 60% to 95%. In one embodiment the efficiency of the power conversion circuit may be approximately 85%.

In some embodiments the power converter may be a single switch Flyback converter and may operate in continuous conduction mode (CCM) or discontinuous conduction mode (DCM). In further embodiments CCM may be used at low input line and full load, and DCM may be used at high input line and/or light load.

Figure 8:
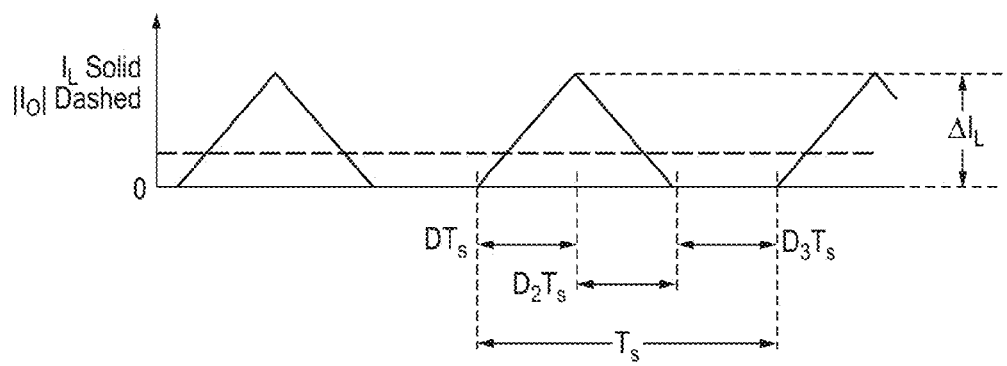
FIG. 8 is waveform of a converter operating in DCM according to an embodiment of the invention.

Now referring to FIG. 8, a waveform of an embodiment with a power converter operating in DCM is illustrated. In this embodiment the inductor current reduces to zero during each switch cycle. In further embodiments, this may occur at light loads and/or when the inductor ripple is large.

Figure 9:
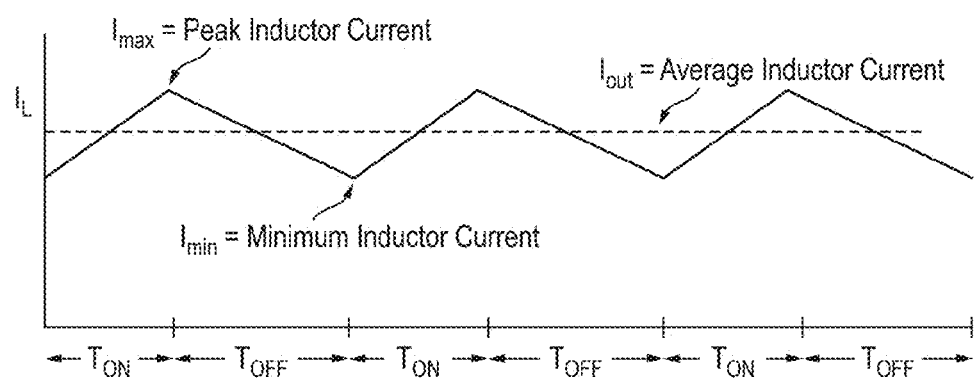
FIG. 9 is waveform of a converter operating in CCM according to an embodiment of the invention.

Now referring to FIG. 9 a waveform of an embodiment with a power converter operating in CCM is illustrated. In one embodiment the inductor current never touches zero during the switching cycle. This may occur at high load and/or when the ripple current is small.

Figure 10:
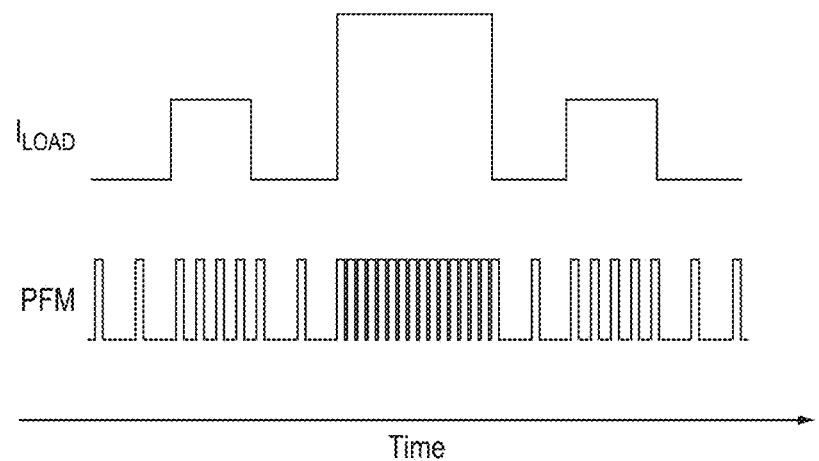
FIG. 10 is an example of pulse frequency modulation (PFM) that may be used according to an embodiment of the invention.

Now referring to FIG. 10, another embodiment is illustrated where pulse frequency modulation (PFM) may be used to vary the switching frequency to meet load demand and improve efficiency. In some embodiments, at light load, the frequency may be reduced, and switching pulses may be skipped to reduce switching loss.

Figure 11:
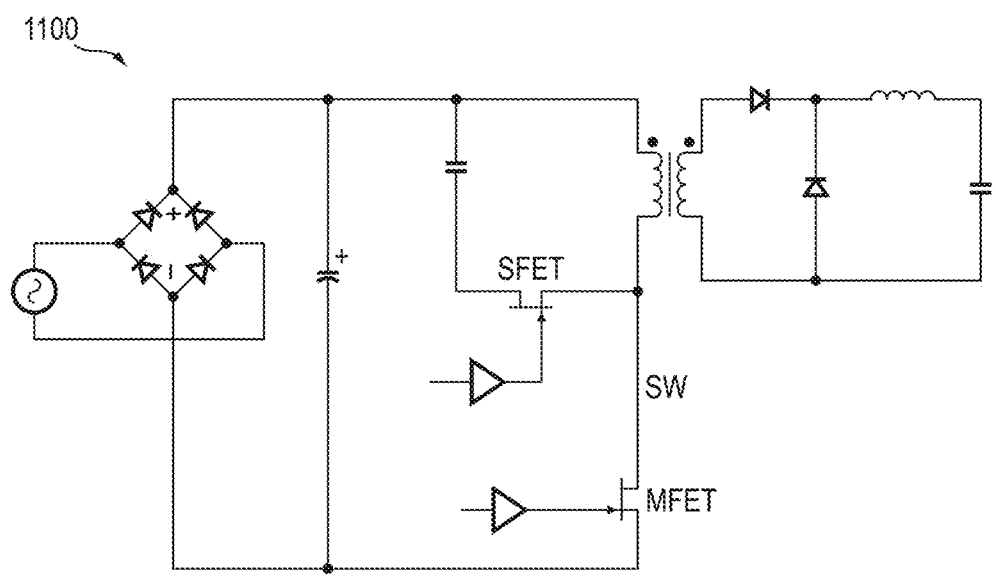
FIG. 11 is an example of different power conversion topologies according to embodiments of the invention.

Now referring to FIG. 11, other embodiments may use different power conversion topologies than a Flyback circuit. In this embodiment power conversion circuit 1100 is a Forward converter. In one embodiment, the relationships of the SFET and the MFET may be similar to the Flyback embodiment discussed above. In this embodiment, the SFET turns on briefly right before the MFET turns on to generate current in the transformer. When the SFET turns off, the generated negative current creates ZVS for the MFET.

Figure 12A:
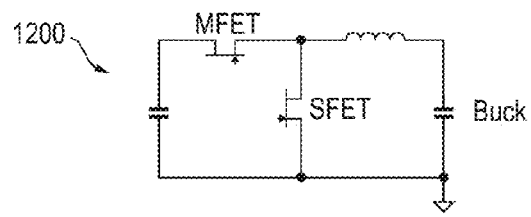
FIGS. 12A-12C are different DC to DC power converter topologies according to embodiments of the invention.
Figure 12B:
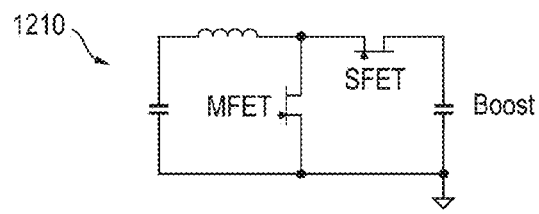
Figure 12C:
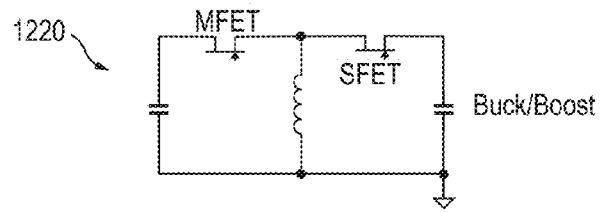

Now referring to FIGS. 12A-12C, embodiments may employ the novel ZVS control scheme discussed above in other DC to DC converter topologies. One of skill in the art will understand that such embodiments also require control and FET driver circuits as discussed above. In one embodiment the DC to DC converter may use inductors instead of transformers. Further embodiments may have different circuit architectures and employ the novel ZVS control scheme discussed above. In such embodiments the relationships of the SFET and the MFET may be similar to the Flyback embodiment discussed above. Further, the SFET may be configured to turn on briefly right before the MEFT turns on to generate current in the transformer. When the SFET turns off, the generated negative current creates ZVS for the MFET. For example, FIG. 12A illustrates circuit 1200 which is an embodiment of a Buck converter that may employ the novel ZVS control scheme. As another example, FIG. 12B illustrates circuit 1210 which is an embodiment of a Boost converter that may also employ the novel ZVS control scheme. As a further example, FIG. 12C illustrates circuit 1220 which is an embodiment of a Buck/Boost converter that may further employ the novel ZVS control scheme. Other circuit architectures may also employ the novel ZVS control scheme and are within the scope of this disclosure.

Figure 13:
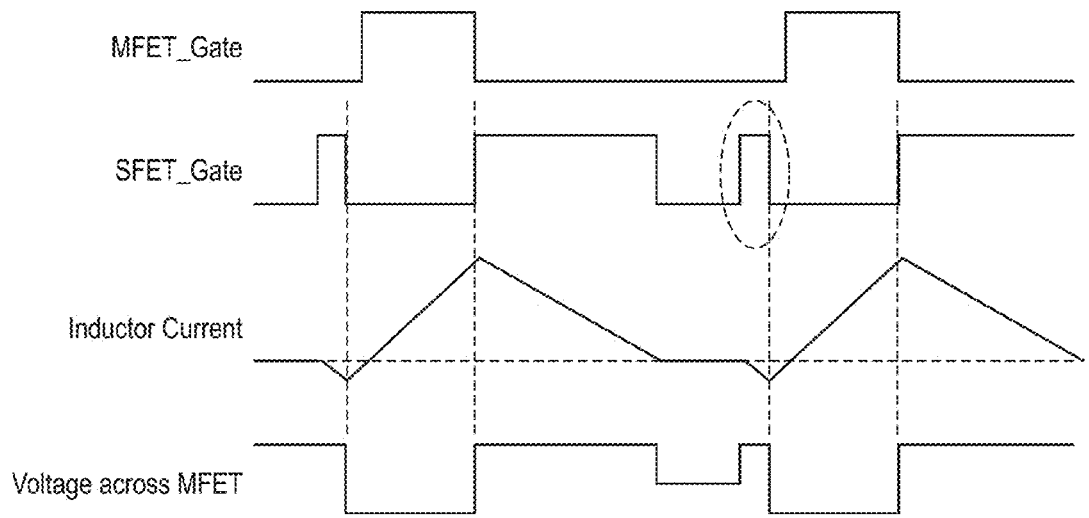
FIG. 13 is an example of waveforms for a DC to DC Buck converter according to an embodiment of the invention.

Now referring to FIG. 13 waveforms of an embodiment employing a DC to DC Buck converter architecture are illustrated. In one embodiment, the Buck converter may operate in a discontinuous mode, where the inductor current reduces to zero after the MFET is off (i.e., when the MFET's gate is low). In further embodiments, the SFET can remain off when the MFET is off. In yet further embodiments, the SFET may turn on when the MFET is off and the inductor current is still positive. In other embodiments it may turn off when the inductor current reduces to zero. In some embodiments this may be called synchronous rectification which may reduce conduction loss. In one embodiment, the SFET may be turned on right before the MFET turn-on event, generating a negative inductor current. In yet further embodiments, after the SFET turns off, the negative inductor may pull the Vds of the MFET to zero. When the MFET turns on at this moment, ZVS may be achieved for the MFET. In other embodiments this concept may be applied to yet other topologies and circuit configurations.

In further embodiments one or more of the features of the power conversion circuit are:
1. There is main switch, and secondary switch. The second switch turns on slightly ahead of the main switch to enable ZVS for the main switch.
2. When the main switch has a voltage oscillation, a secondary switch can turn on at the peak of the main switch voltage to reduce any switching losses related to the second switch.
3. The second switch can turn on any time before the main switch.
4. The second switch can turn on/off opposite of the main switch in a complementary fashion. This creates a continuous current mode condition, whenever it is desirable.
5. The second switch can be the same as the first switch.
6. Particularly in single switch Flyback circuits with the synchronous rectification switch on the secondary side, the secondary side switch can be used as the ZVS switch that turns on ahead of the main switch.
7. In synchronous rectification mode, the second switch can turn off when the inductor current reduces to zero. This may be called discontinuous current condition mode. Then the second switch stays off until right before the main switch turns on.
8. In situations when the voltage ringing across the main switch is large enough to achieve ZVS, the second switch can remain off and may not be activated.
9. During conditions such as light load, the second switch can remain off without being activated.

10. This novel ZVS scheme applies to many circuit topologies such as Buck, Buck/Boost, Boost, Flyback, Forward and other converter topologies.

11. This novel ZVS scheme may be particularly useful for circuits that use GaN as power devices.

Integration and Co-Packaging

Figure 14:
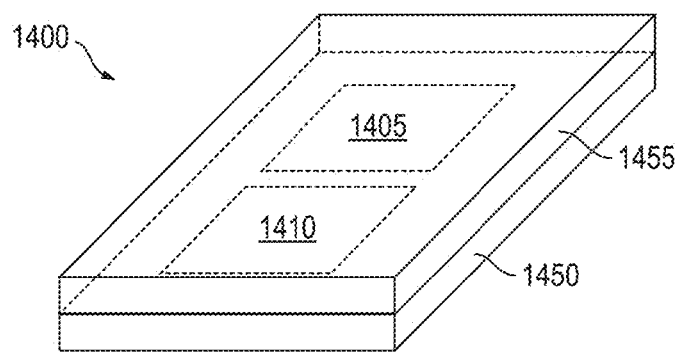
FIG. 14 is an example of co-packaged devices according to an embodiment of the invention.

Now referring to FIG. 14, in some embodiments one or more electronic components may be integrated within a single electronic package 1400 (i.e., co-packaged). In one embodiment MFET 1405 and SFET 1410 may be co-packaged in a unitary electronic package 1400. In one embodiment MFET 1405 and SFET 1410 may each have external source, gate and drain connections. An external connection may be an electrical connection that is made outside of package 1400, such as a solder connection to another circuit board. In further embodiments, MFET 1405 may have external gate and source connections and an internal drain connection to a source of SFET 1410, forming switch node (e.g., item 120 in FIG. 1). In some embodiments, the switch node may also have an external connection. The drain and gate of SFET 1410 may further have an external connections on package 1400. Co-packaging may result in reduced packaging cost, decreased size and improved performance for the power converter, as discussed in more detail below.

Figure 15:
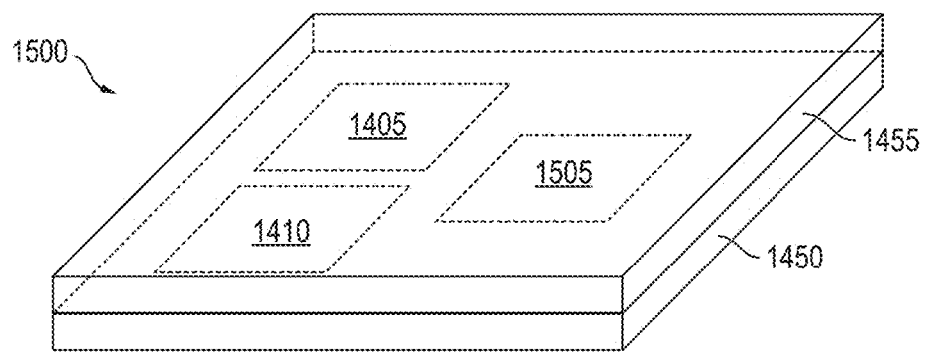
FIG. 15 is an example of co-packaged devices according to an embodiment of the invention.

In further embodiments illustrated in FIG. 15, electronic package 1500 may have a dual driver 1505 (i.e., a single die that drives both the MFET and the SFET) co-packaged with MFET 1405 and SFET 1410. In such embodiments dual driver 1505 may be internally electrically connected to the gate terminals of MFET 1405 and SFET 1410. Thus, gate driver 1505 may have one or more external gate control connections on package 1500 that are electrically coupled to the controller. Similar to package 1400, package 1500 may also have external MFET source, switch node and SFET drain connections. In yet further embodiments, one or more other active or passive electronic components such as, but not limited to capacitors, resistors, diodes and the like may be integrated within the unitary package. In other embodiments the controller (not shown) may also be co-packaged with driver 1505 and one or more of FETs 1405, 1410. In such embodiments, there may be one or more external controller connections along with the MFET and SFET connections discussed above.

In some embodiments, particularly in high frequency applications, co-packaging driver 1505 with one or more of FETs 1405, 1410 may enable improved converter performance through the elimination of packaging and component interconnect parasitics. All conductors and electrical components possess parasitic elements. For instance, a resistor is designed to possess resistance, but will also possess unwanted parasitic capacitance. Similarly, a conductor is designed to conduct an electrical signal, but will also possess unwanted parasitic resistance and inductance. Parasitic elements cause propagation delays and impedance mismatches which limit the operating frequency of the converter. Thus, the elimination and or minimization of conductors and interconnect structures between electronic components eliminates/minimizes parasitic elements that limit the maximum operating frequency of the converter.

In some embodiments electronic packages 1400, 1500 may be what are known as organic multi-chip modules. An organic substrate 1450, such as, but not limited to a printed circuit board, may be used as a mount for the FETs 1405, 1410 and/or driver 1505, controller and other components and may also provide electrical interconnectivity between the devices within the package and/or between the devices and the system to which package 1400, 1500 is mounted. In some embodiments one or more devices may be attached to the substrate with an electrically conductive material such as, but not limited to, solder or epoxy. In some embodiments the electronic devices may be electrically interconnected to the substrate with wire bonds while in further embodiments flip-chip devices, conductive columns or other electrical interconnects may be used. An electrically insulative potting compound 1455 may be molded on top of the substrate and around the electrical devices to provide environmental protection.

Interconnections between electronic packages 1400, 1500 and another electronic system, such as a printed circuit board, may be referred to herein as external connections. External connections between electronic packages 1400, 1500 and the system may be made with, but not limited to, solder or conductive epoxy. Other methods and structures may be used to co-package the devices without departing from the invention.

In further embodiments the package may be what is known as a lead-frame based multi-chip module where substrate 1450 is a metallic leadframe. Electrical interconnects between the devices and the leadframe may be performed as discussed above. The one or more electronic devices may be attached to the leadframe and the assembly may be over molded with electrically insulative potting compound 1455 as discussed above. External connections may also be formed as discussed above.

Figure 16:
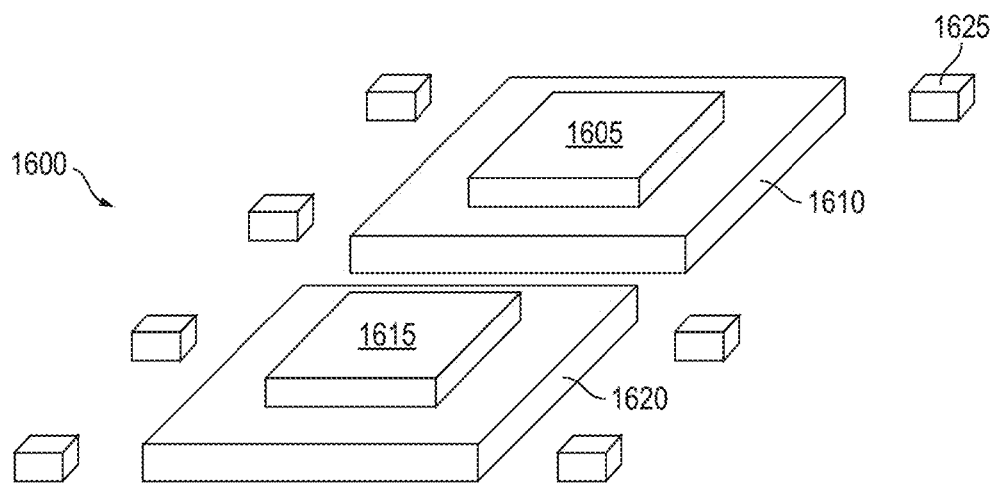
FIG. 16 is an example of co-packaged devices according to an embodiment of the invention.

Now referring to FIG. 16 an example lead-frame layout 1600 for an SO-8, leadless chip carrier or other package is illustrated. MFET 1605 is placed on first die paddle 1610 and SFET 1615 is placed on second die paddle 1620. Connections may be made from MFET 1605 and SFET 1615 to first die paddle 1610 and/or peripheral connections 1625 using one or more electrical conductors such as wirebonds, metallic straps, other conductive interconnects. In such embodiments, the electronic package may have external connections for the gate, the source and the drain for MFET 1605 and SFET 1615, respectively. Alternatively, two of the FET connections may form a switchnode connection, as discussed above. In further embodiments, driver circuit may be integrated on MFET 1605 or SFET 1615 die and thus the package would have one or more driver controller connections.

Figure 17:
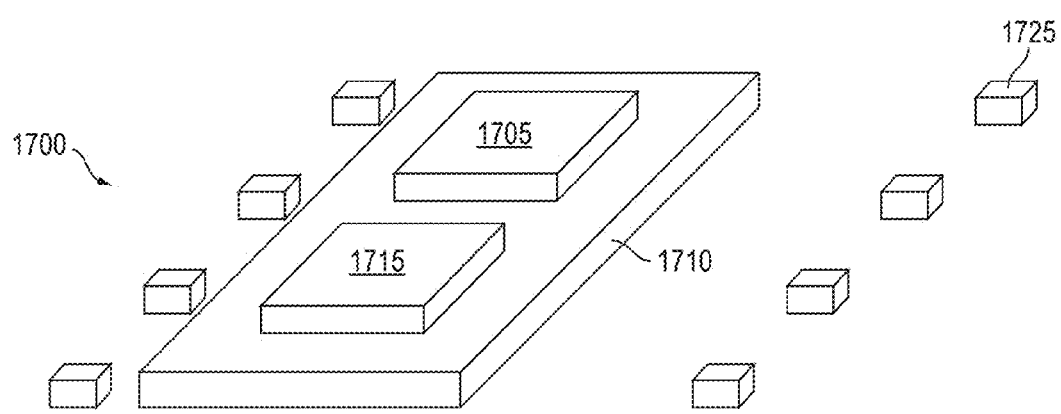
FIG. 17 is an example of co-packaged devices according to an embodiment of the invention.

Now referring to FIG. 17 an example lead-frame layout 1700 for an SO-8, leadless chip carrier or other package is illustrated. In one embodiment die 1705 may be an MFET and placed on first die paddle 1710 along with second die 1715 which may be an SFET. Connections may be made from first die 1705 and second die 1715 to die paddle 1710 and/or peripheral connections 1725, as discussed above. The electronic package may have one or more external electrical connections as discussed above. In further embodiments, first die 1705 may be a monolithically integrated driver circuit along with an MFET and/or SFET device and die 1705 may comprise a controller die. In such embodiments, the package may not have external driver control connections and may have one or more controller connections such as, but not limited to driver power and feedback connections.

Figure 18:
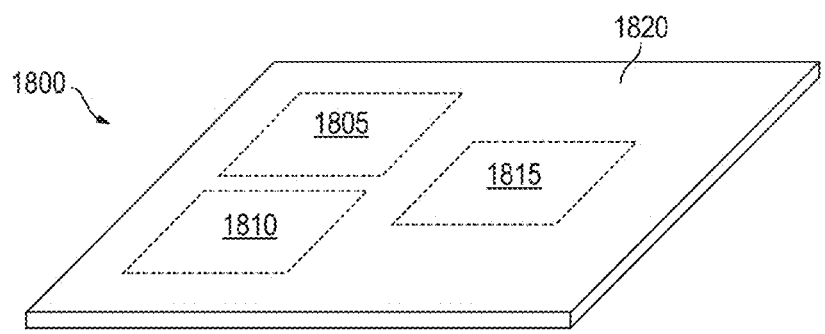
FIG. 18 is an example of monolithically integrated devices according to an embodiment of the invention.

Now referring to FIG. 18, in some embodiments one or more electronic devices may be fabricated on a monolithic semiconductor substrate 1800. More specifically, in one embodiment MFET region 1805 and SFET region 1810 may both be fabricated on one semiconductor die 1820. In further embodiments, driver region 1815 may also be fabricated on single semiconductor die 1820 along with MFET region 1805 and SFET region 1810. Thus, in such embodiments, one die may contain the functionality of three or more single die. As discussed above, GaN FETs may be particularly useful for such integration as they are lateral devices and regions 1805, 1810 and 1815 can all be electrically isolated from one another. In such embodiments, die 1800 may have one or more external connections such as, but not limited to source and drain connections for MFET region 1805 and SFET region 1810 along with one or more controller connections.

In yet further embodiments one or more of the semiconductor devices may be manufactured on a substrate comprising gallium nitride (GaN). In one embodiment one or more of the devices may be fabricated on a substrate having a base of silicon with an epitaxially deposited layer of GaN. In other embodiments different substrate configurations may be employed.

In some embodiments, GaN based devices may be particularly well suited to switch at high frequencies due to their lower output capacitance, or Coss values. As discussed above, each time the FET turns on, the energy stored in the output capacitance will be dissipated in the device. As the switching frequency increases, the power dissipation in the FET due to discharging this energy increases proportionately, which may become a limiting factor in hard switching topologies.

In some embodiments, with regard to ZVS switched GaN devices, the relatively small Coss associated with GaN devices, on the order of 10 picofarads, may enable faster discharging of the Coss and thus higher switching frequencies. In further embodiments GaN devices also switch relatively fast, on the order of 2 nanoseconds, enabling them to operate at high frequencies.

Further, in some embodiments GaN devices may be operated with relatively small driver circuits, even at high voltages, making the size and the cost of the driver circuit attractive for high voltage applications. Yet further, since GaN devices are lateral, as discussed above, and the driver circuit may be relatively small, some embodiments may benefit from integrating the driver circuit monolithically or co-packaged with one or more of the FETs, as discussed in more detail below.

Integrated Driver Circuits

In some embodiments, it may be beneficial to integrate a driver circuit on the same die as, or co-packaged with either of the FETs to minimize interconnect parasitics, enabling higher switching frequencies, as discussed above. Integrating more than two circuit elements on a single die may eliminate even more parasitic elements and further increase the operating frequency as well as reduce costs.

Figure 19:
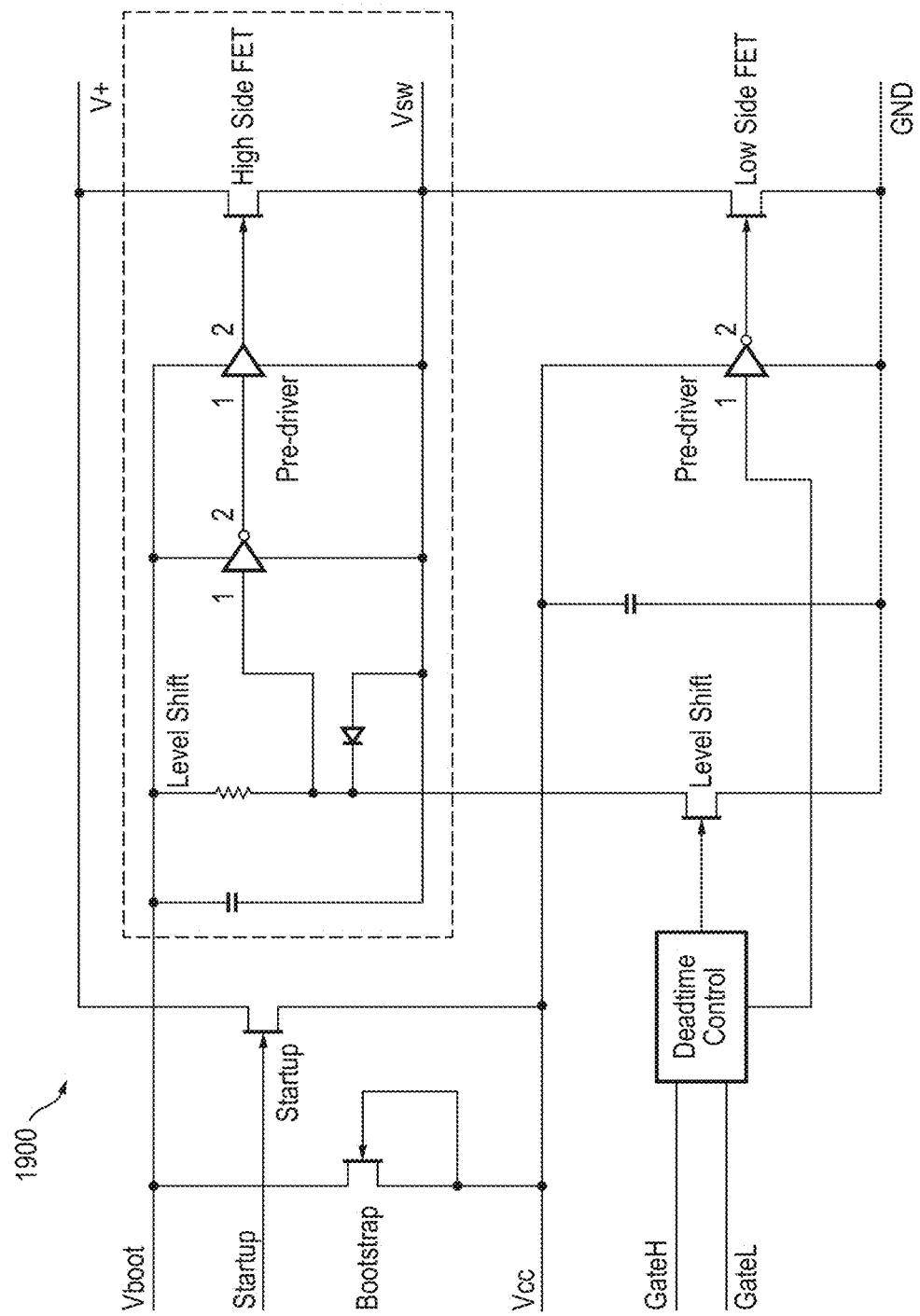
FIG. 19 is an example of a two switch half-bridge Flyback circuit according to an embodiment of the invention.

The schematic in FIG. 19 illustrates a two switch half-bridge Flyback circuit 1900 that incorporates some embodiments of the invention. Each high side or low side FET has an integrated driver circuit, also called a pre-driver to turn on or off according to gate signals (GateH and GateL). In some embodiments the gate control can be one signal while in other embodiments it may be two separate signals. In one embodiment, GateH may be used to control the high side FET and GateL may be used to control the low side FET. In further embodiments the high side circuit (see dashed box in FIG. 19) can move up and down by approximately 600V. Therefore, in this embodiment the gate drive circuit for the high side FET may float with $V_{SW}$ node. The gate drive control signal for the high side may be translated through a level shifter circuit, which may be integrated into the half bridge block. As defined herein, a level shifter circuit may convert the voltage potential of a signal to a different voltage potential.

In further embodiments, a startup circuit may be included to deliver bias current to the half bridge block during initial power up. The startup circuit may draw current from the high voltage V+ node. Once the control circuit is fully biased, the startup FET can be turned off to reduce power loss. In yet further embodiments, the high side circuit may need a bias supply to drive the main FET. In some embodiments a bootstrap circuit may be used to deliver power to high side circuit to drive the main FET. In one embodiment, the bootstrap circuit can be used to charge a high side capacitor when the low side FET turns on.

In some embodiments, two switch half-bridge Flyback circuit 1900 may be implemented as a multi-chip hybrid solution including GaN-based high side and GaN-based low side switches. In one embodiment, the entire circuit may be disposed on a single die. In further embodiments the high side circuit (see dashed box in FIG. 19) may be on one die and the remainder of the circuit may be on another die. In yet further embodiments both the high side power switch and the low side power switch may be discrete GaN-based power switches and may be co-packaged with a half-bridge driver to form a half-bridge power block.

Figure 20:
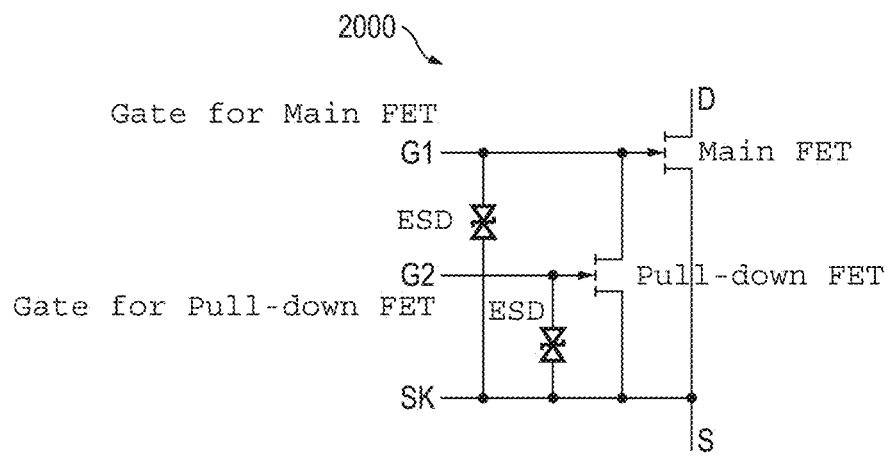
FIG. 20 is an example of a monolithically integrated GaN transistor including its own drive circuit according to an embodiment of the invention.

Now referring to FIG. 20, each GaN transistor may have its own drive circuit monolithically integrated with the FET. Circuit 2000 illustrates an embodiment of a simplified integrated drive circuit for a single FET. For example, MFET 105 and SFET 106 (see FIG. 1) may each contain a circuit similar to circuit 2000. In some embodiments the main FET can be a high voltage FET. In one embodiment, an internal low voltage pull-down FET can be used to hold the gate of main FET low while minimizing layout related noise injection so the main FET doesn't turn on accidentally. In this simplified integrated drive circuit, two gate signals may be available. In one embodiment, the main FET gate may control the main FET and the pull-down FET gate may control the small FET. The timing of both gate signals may be handled by an external control circuit. In further embodiments, the gate terminals may be ESD (electrical static discharge) sensitive. In one embodiment integrated clamp circuits may be used to protect the gate from ESD voltage.

Figure 21:
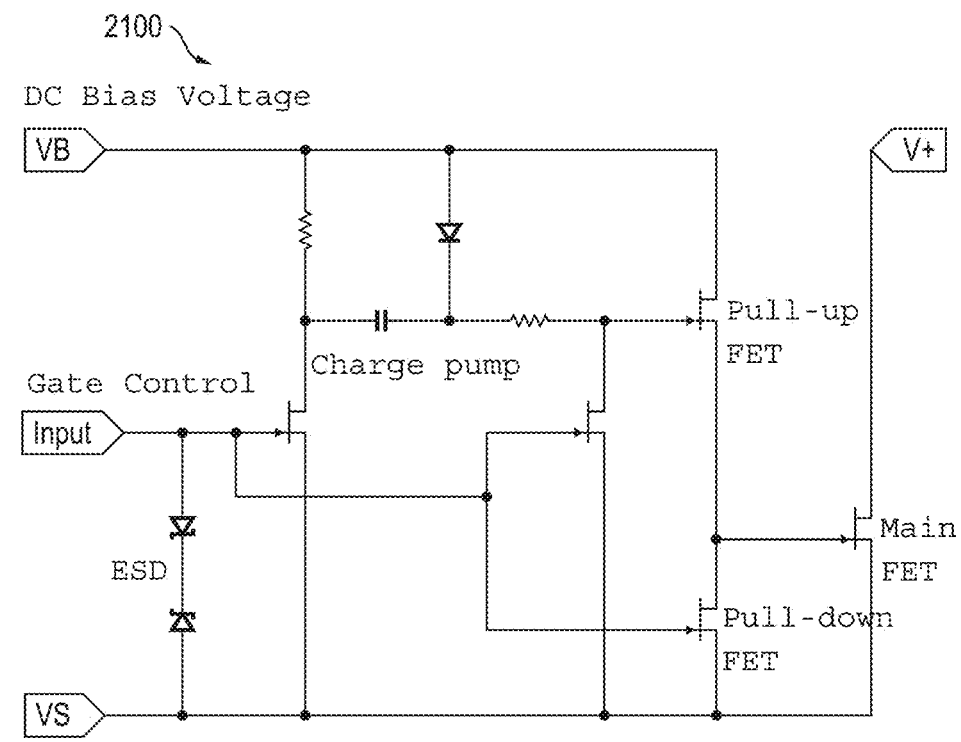
FIG. 21 is an example of a monolithically integrated GaN transistor including its own drive circuit according to an embodiment of the invention.

Now referring to FIG. 21 an integrated drive circuit 2100 for a single FET is illustrated. Circuit 2100 may be used as a building block for more complicated multi-switch circuits such as two switch half bridge Flyback circuit 1900 illustrated in FIG. 19. Continuing to refer to FIG. 19, in some embodiments each pre-driver and each power FET may use an integrated drive circuit 2100. In contrast to circuit 2000 illustrated in FIG. 20, circuit 2100 has both integrated pull-up and integrated pull-down transistors. In one embodiment a single gate control signal may be used that may control the pull-up and pull-down using proper logic. In further embodiments, the DC biased voltage node may provide drive current to the main gate. In other embodiments, a charge pump circuit may be used to boost voltage internally to drive the pull-up FET. In further embodiments, an ESD structure may be integrated to protect the input signal from high ESD voltages. In yet further embodiments, an additional FET and diode may be used to provide proper logic and timing control.

In some embodiments, an advantage of an integrated drive circuit may make the device relatively easy for a circuit designer to incorporate and it may also provide a rugged circuit with integrated protection. Further, in some embodiments, the input signal may be a logic signal that doesn't need to be strong to provide gate drive current. Therefore, such circuits may save the circuit designer from adding an external drive device. Moreover, in some embodiments noise may be suppressed internally, and noise coupling from an external circuit may be minimized.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A power conversion circuit comprising:
    a voltage source having first and second output terminals configured to supply power to the power conversion circuit;
    a first solid-state switch having a pair of first power terminals and a first gate terminal wherein one of the pair of first power terminals are connected to a switch node of the power conversion circuit;
    a first driver circuit transmitting a first gate drive signal to the first gate terminal in response to receiving a first gate control signal;
    a second solid-state switch having a pair of second power terminals and a second gate terminal, wherein one of the pair of second power terminals are connected to the switch node of the power conversion circuit;
    a second driver circuit transmitting a second gate drive signal to the second gate terminal in response to receiving a second gate control signal;
    an inductor having a pair of inductor terminals, wherein one of the pair of inductor terminals are connected to the switch node of the power conversion circuit; and
    a controller configured to:
        transmit the first and the second gate control signals such that the second switch turns on before the first switch turns on, with a duration that is (1) less than a time that the first switch is off and (2) of adequate time to reverse a direction of current flow within the inductor to generate a quantity of negative inductor current; and
        transmit the second gate control signal turning the second switch off causing the quantity of negative inductor current to (1) discharge an output capacitance of the first switch and (2) discharge a capacitance of the switch node.

2. The power conversion circuit of claim 1 wherein one of the pair of first power terminals are connected to the first terminal of the voltage source and one of the pair of second power terminals are connected to the switch node.

3. The power conversion circuit of claim 2 wherein the pair of first power terminals include a first source terminal and a first drain terminal, the first source terminal coupled to the switch node and the first drain terminal coupled to the first terminal of the voltage source.

4. The power conversion circuit of claim 2 wherein one of the pair of second power terminals are connected to the second terminal of the voltage source and one of the pair of second power terminals are connected to the switch node.

5. The power conversion circuit of claim 1 wherein one of the pair of first power terminals are connected to the second terminal of the voltage source and one of the pair of second power terminals are connected to the switch node.

6. The power conversion circuit of claim 5 wherein the pair of first power terminals include a first source terminal and a first drain terminal, the first source terminal coupled to the second terminal of the voltage source and the first drain terminal coupled to the switch node.

7. The power conversion circuit of claim 1 wherein the first and second solid-state switches are bidirectional and comprise gallium nitride.

8. The power conversion circuit of claim 1 wherein the first and second solid-state switches operate at frequencies between 50 kHz and 100 MHz.

9. The power conversion circuit of claim 1 wherein the first and the second driver circuits are co-packaged with the first and second solid-state switches.

10. The power conversion circuit of claim 9 wherein the first and the second driver circuits and the first and second solid-state switches are disposed on a printed circuit board and an electrically insulative mold compound encapsulates a top surface of the printed circuit board, the first and the second driver circuits and the first and the second solid-state bidirectional switches.

11. The power conversion circuit of claim 9 wherein the first and the second driver circuits and the first and second solid-state switches are disposed on a leadframe and an electrically insulative mold compound encapsulates a top surface of the leadframe, the first and the second driver circuits and the first and the second solid-state bidirectional switches.

12. The power conversion circuit of claim 1 wherein the first driver circuit and the first solid-state bidirectional switch are monolithically integrated on a first die, and the second driver circuit and the second solid-state bidirectional switch are monolithically integrated on a second die.

13. The power conversion circuit of claim 1 wherein the first and second solid-state switches are bidirectional and comprise gallium nitride.

14. A method of operating a power conversion circuit, the method comprising:
    supplying power to the circuit with a voltage source having a first and a second output terminal;
    transmitting a first gate control signal to a first driver circuit, in response the first driver circuit transmitting a first gate drive signal to a gate of a first solid-state switch, the first switch having a pair of first power terminals wherein one of the pair of first power terminals are connected to a switch node of the power conversion circuit;
    transmitting a second gate control signal to a second driver circuit, in response the second driver circuit transmitting a second gate drive signal to a gate of a second solid-state switch, the second switch having a pair of second power terminals wherein one of the pair of second power terminals are connected to the switch node of the power conversion circuit, and wherein an inductor is coupled between the switch node and the voltage source; and
    operating a controller configured to:
        transmit the first and the second gate control signals such that the second solid-state bidirectional switch turns on and remains in an on state for a duration that is (1) less than a time that the first solid-state bidirectional switch is in an off state and (2) of sufficient time to reverse a direction of current flow within the inductor to generate a negative inductor current; and transmit the second gate control signal turning the second solid-state bidirectional switch off causing the negative inductor current to (1) discharge an output capacitance of the first solid-state bidirectional switch and (2) discharge a capacitance of the switch node.

15. The power conversion circuit of claim 14 wherein one of the pair of first power terminals are connected to the first output terminal of the voltage source and one of the pair of second power terminals are connected to the switch node.

16. The power conversion circuit of claim 15 wherein the pair of first power terminals include a first source terminal and a first drain terminal, the first source terminal coupled to the switch node and the first drain terminal coupled to the first output terminal of the voltage source.

17. The power conversion circuit of claim 15 wherein one of the pair of second power terminals are connected to the second output terminal of the voltage source and one of the pair of second power terminals are connected to the switch node.

18. The power conversion circuit of claim 14 wherein one of the pair of first power terminals are connected to the second output terminal of the voltage source and one of the pair of second power terminals are connected to the switch node.

19. The power conversion circuit of claim 18 wherein the pair of first power terminals include a first source terminal and a first drain terminal, the first source terminal coupled to the second output terminal of the voltage source and the first drain terminal coupled to the switch node.

20. The power conversion circuit of claim 14 wherein the first and the second driver circuits and the first and second solid-state switches are disposed on a substrate and an electrically insulative mold compound encapsulates a top surface of the substrate, the first and the second driver circuits and the first and the second solid-state bidirectional switches.

\* \* \* \* \*